(12) United States Patent
Johns et al.

(10) Patent No.: US 7,500,035 B2
(45) Date of Patent: Mar. 3, 2009

(54) LIVELOCK RESOLUTION METHOD

(75) Inventors: Charles R. Johns, Austin, TX (US);
David J. Krolak, Rochester, MN (US);
Peichun P. Liu, Austin, TX (US); Alvan W. Ng, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 157 days.

(21) Appl. No.: 11/532,987

(22) Filed: Sep. 19, 2006

(65) Prior Publication Data
US 2008/0071955 A1 Mar. 20, 2008

(51) Int. Cl.
G06F 13/36 (2006.01)
G06F 12/00 (2006.01)
G06F 13/14 (2006.01)
G06F 13/38 (2006.01)

(52) U.S. Cl. .................. 710/113; 710/200; 710/241

(58) Field of Classification Search .......... 710/113, 710/200, 241; 712/245
See application file for complete search history.

(56) References Cited

U.S. PATENT DOCUMENTS

| | | | |
|---|---|---|---|
| 5,761,446 A | 6/1998 | Donley et al. | |
| 6,073,182 A * | 6/2000 | Jones et al. | 709/253 |
| 6,078,981 A | 6/2000 | Hill et al. | |
| 6,151,655 A * | 11/2000 | Jones et al. | 710/244 |
| 6,523,076 B1 | 2/2003 | Kruse | |
| 7,000,047 B2 * | 2/2006 | Nguyen et al. | 710/200 |
| 7,065,596 B2 * | 6/2006 | Kulick et al. | 710/240 |
| 7,219,178 B2 * | 5/2007 | Harris et al. | 710/110 |
| 2004/0068597 A1 * | 4/2004 | Kulick et al. | 710/240 |
| 2004/0073732 A1 * | 4/2004 | Chae | 710/113 |
| 2004/0215933 A1 | 10/2004 | Nguyen et al. | |
| 2007/0174530 A1 * | 7/2007 | Genova et al. | 710/241 |
| 2007/0245129 A1 * | 10/2007 | Abernathy et al. | 712/220 |
| 2007/0277025 A1 * | 11/2007 | Altman et al. | 712/245 |
| 2008/0065873 A1 * | 3/2008 | Hall et al. | 712/245 |
| 2008/0071955 A1 * | 3/2008 | Johns et al. | 710/113 |

* cited by examiner

*Primary Examiner*—Mark Rinehart
*Assistant Examiner*—Ryan M Stiglic
(74) *Attorney, Agent, or Firm*—Stephen R. Tkacs; Stephen J. Walder, Jr.; Matthew B. Talpis

(57) ABSTRACT

A mechanism is provided for resolving livelock conditions in a multiple processor data processing system. When a bus unit detects a timeout condition, or potential timeout condition, the bus unit activates a livelock resolution request signal. A livelock resolution unit receives livelock resolution requests from the bus units and signals an attention to a control processor. The control processor performs actions to attempt to resolve the livelock condition. Once a bus unit that issued a livelock resolution request has managed to successfully issue its command, it deactivates its livelock resolution request. If all livelock resolution request signals are deactivated, then the control processor instructs the bus and all bus units to resume normal activity. On the other hand, if the control processor determines that a predetermined amount of time passes without any progress being made, it determines that a hang condition has occurred.

20 Claims, 4 Drawing Sheets

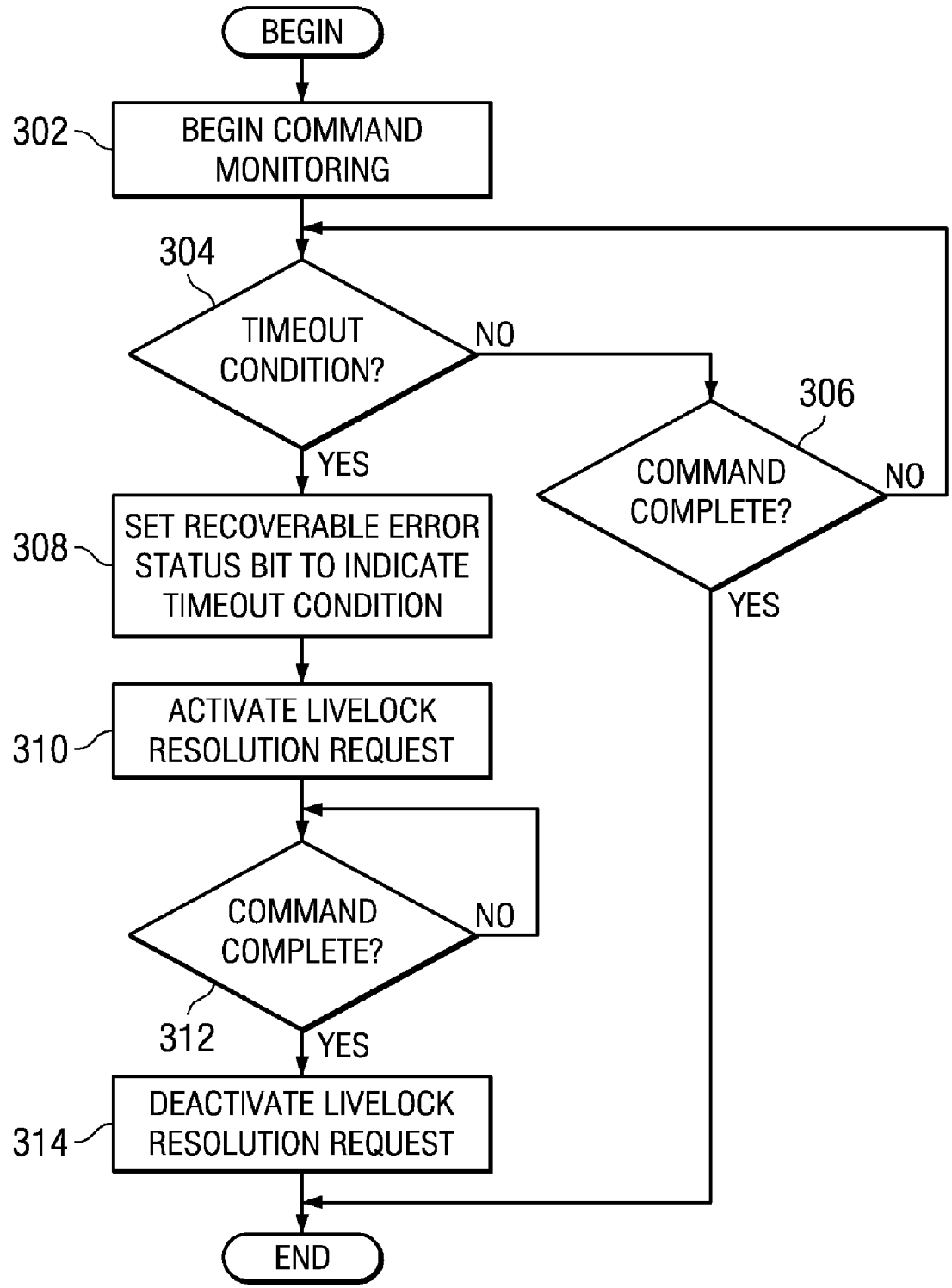

LIVELOCK RESOLUTION METHOD

BACKGROUND

1. Technical Field

The present application relates generally to an improved data processing system and method. More specifically, the present application is directed to a method and apparatus for resolving livelock in a data processing system.

2. Description of Related Art

Deadlock is a situation where two or more processes in a data processing system are unable to proceed because each is waiting for one of the others to do something. A common example is a program communicating to a server that may be in a state of waiting for output from the server before sending anything more to the server, while the server is similarly waiting for more input from the controlling program before outputting anything. This particular type of deadlock is sometimes called a "starvation deadlock," although the term "starvation" is more properly used for situations where a program can never run simply because it never gets high enough priority.

A livelock is similar to a deadlock, except that the state of the two processes involved in the livelock constantly changes with regards to the other process. As a real world example, livelock occurs when two people meet in a narrow corridor, and each tries to be polite by moving aside to let the other pass, but they end up swaying from side to side without making any progress because they always both move the same way at the same time. For example, two or more processing elements may be stuck in loops because each processing element repeatedly reaches a point in the loop where it must tell the other to retry a particular command. A livelock can occur, for example, when a process that calls another process is itself called by that process. A livelock may be caused by malicious code or a software or hardware design bug.

A number of solutions in the prior art are concerned with preventing livelocks in a multiprocessor system. However, despite these efforts, combinations of software sequences and the way the hardware executes it may still conspire to create a livelock anyway.

A multiprocessor system typically provides each processing element with a watchdog timer. If a command begins and the watchdog time expires without any progress being made on the command, the processing element may signal that a "hang" has occurred. A hang is a freezing condition where the processor cannot continue execution. In the prior art, a service processor or control processor may signal a checkstop to the processors upon a hang condition, thus stopping the clock.

SUMMARY

The illustrative embodiments recognize the disadvantages of the prior art and provide a mechanism for resolving livelock conditions in a multiple processor data processing system. When a bus unit detects a timeout condition, or potential timeout condition, the bus unit activates a livelock resolution request signal. A livelock resolution unit receives livelock resolution requests from the bus units and signals an attention to a control processor. The control processor performs actions to attempt to resolve the livelock condition. For example, the control controller may thermal throttle one or more processing elements, quiesce one or more processing elements, or signal the bus to serialize bus commands.

In one illustrative embodiment, a method for livelock resolution in a data processing system is provided. The processing system comprises a bus, at least one primary processing element, and a plurality of support processing elements. The method comprises responsive to a timeout condition in at least one of a plurality of bus units, generating a livelock resolution request signal and responsive to the livelock resolution request signal, signaling an attention to a control processor. Responsive to the attention, the control processor sets status information to perform one or more actions to attempt to correct a potential livelock condition. The status information comprises a livelock resolution signal. The method further comprises responsive to the control processor setting the livelock resolution signal, quiescing at least a subset of the primary processing element and the plurality of support processing elements.

In one exemplary embodiment, the status information comprises bus mode information. The method further comprises responsive to the control processor setting the bus mode signal to a serialized mode, entering the bus into a serialized mode.

In another exemplary embodiment, quiescing at least a subset of the primary processing element and the plurality of support processing elements comprises throttling the at least one primary processing element.

In a further exemplary embodiment, the plurality of bus units comprise the at least one primary processing element, the plurality of support processing elements, and the bus. In another exemplary embodiment, the plurality of bus units comprises a memory control unit or a peripheral control unit. In a still further embodiment, each bus unit within the plurality of bus units has a watchdog timer, wherein the timeout condition exists when the watchdog timer expires. In yet another exemplary embodiment, each bus unit within the plurality of bus units has a watchdog timer. The timeout condition exists when the watchdog timer is a predetermined percentage away from expiring.

In another exemplary embodiment, generating a livelock resolution request signal comprises receiving livelock resolution request signals from the plurality of bus units and combining the livelock resolution request signals from the plurality of bus units to form a combined livelock resolution request signal. In a further exemplary embodiment, generating a livelock resolution request signal further comprises determining whether the combined livelock resolution request signal is activated for a predetermined amount of time.

In another illustrative embodiment, an apparatus for livelock resolution in a data processing system is provided. The processing system comprises a bus, at least one primary processing element, and a plurality of support processing elements. The apparatus comprises detection logic that detects a livelock condition. The detection logic signals an attention to a control processor responsive to presence of a livelock condition. Responsive to the attention, the control processor sets status information to perform one or more actions to attempt to correct a potential livelock condition. The status information comprises a livelock resolution signal. The apparatus further comprises activation logic that engages quiescing of at least a subset of the primary processing element and the plurality of support processing elements responsive to a livelock resolution signal from the control processor or a throttle signal from the control processor.

In one exemplary embodiment, the status information comprises bus mode information. The apparatus further comprises bus mode logic that engages a serialized bus mode at the bus responsive to the control processor setting the bus mode signal to a serialized mode.

In another exemplary embodiment, quiescing at least a subset of the primary processing element and the plurality of support processing elements comprises throttling the at least one primary processing element.

In other exemplary embodiments, the apparatus performs various ones of the operations outlined above with regard to the method in the illustrative embodiments.

In a further illustrative embodiment, a data processing system comprises a bus, at least one primary processing element connected to the bus, a plurality of secondary processing elements connected to the bus, a livelock resolution unit connected to the bus, and a control processor connected to the livelock resolution unit. Responsive to a livelock condition in at least one of a plurality of bus units, the livelock resolution unit signals an attention to a control processor. Responsive to the attention signaled from the livelock resolution unit, the control processor generates a livelock resolution signal and a serialized bus mode signal. Responsive to the livelock resolution signal from the control processor, the livelock resolution unit throttles the at least one primary processing element and quiesces the plurality of support processing elements.

In one exemplary embodiment, responsive to the attention signaled from the livelock resolution unit, the control processor generates a serialized bus mode signal. Responsive to the serialized bus mode signal, the livelock resolution unit enters the bus into a serialized bus mode.

In another exemplary embodiment, quiescing at least a subset of the primary processing element and the plurality of support processing elements comprises throttling the at least one primary processing element.

In a further exemplary embodiment, the plurality of bus units comprise the at least one primary processing element, the plurality of support processing elements, and the bus.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 3 is a flowchart illustrating operation of a command monitoring component within a bus unit within a multiple processor data processing system with livelock resolution in accordance with an illustrative embodiment.

DETAILED DESCRIPTION OF THE ILLUSTRATIVE EMBODIMENTS

Figure 1:
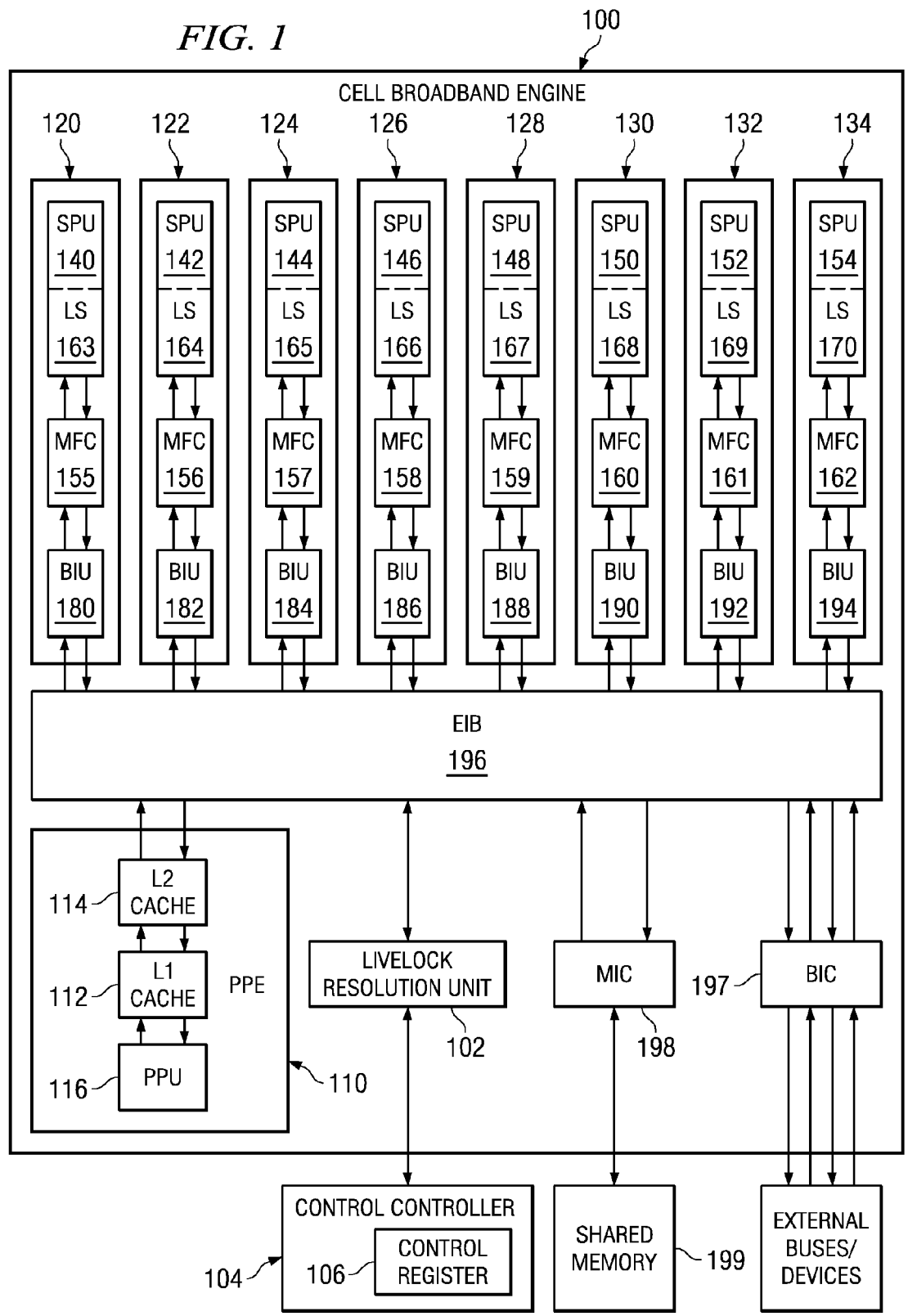
FIG. 1 is an exemplary block diagram of a data processing system in which aspects of the present invention may be implemented.

FIG. 1 is an exemplary block diagram of a data processing system in which aspects of the present invention may be implemented. The exemplary data processing system shown in FIG. 1 is an example of the Cell Broadband Engine (CBE) data processing system. While the CBE will be used in the description of the preferred embodiments of the present invention, the present invention is not limited to such, as will be readily apparent to those of ordinary skill in the art upon reading the following description.

As shown in FIG. 1, the CBE 100 includes a power processor element (PPE) 110 having a processor (PPU) 116 and its L1 and L2 caches 112 and 114, and multiple synergistic processor elements (SPEs) 120-134 that each has its own synergistic processor unit (SPU) 140-154, memory flow control 155-162, local memory or store (LS) 163-170, and bus interface unit (BIU unit) 180-194 which may be, for example, a combination direct memory access (DMA), memory management unit (MMU), and bus interface unit. A high bandwidth internal element interconnect bus (EIB) 196, a bus interface controller (BIC) 197, and a memory interface controller (MIC) 198 are also provided.

The local memory or local store (LS) 163-170 is a non-coherent addressable portion of a large memory map which, physically, may be provided as small memories coupled to the SPUs 140-154. The local stores 163-170 may be mapped to different address spaces. These address regions are continuous in a non-aliased configuration. A local store 163-170 is associated with its corresponding SPU 140-154 and SPE 120-134 by its address location, such as via the SPU Identification Register, described in greater detail hereafter. Any resource in the system has the ability to read/write from/to the local store 163-170 as long as the local store is not placed in a secure mode of operation, in which case only its associated SPU may access the local store 163-170 or a designated secured portion of the local store 163-170.

The CBE 100 may be a system-on-a-chip such that each of the elements depicted in FIG. 1 may be provided on a single microprocessor chip. Moreover, the CBE 100 is a heterogeneous processing environment in which each of the SPUs may receive different instructions from each of the other SPUs in the system. Moreover, the instruction set for the SPUs is different from that of the PPU, e.g., the PPU may execute Reduced Instruction Set Computer (RISC) based instructions while the SPU execute vectorized instructions.

The SPEs 120-134 are coupled to each other and to the L2 cache 114 via the EIB 196. In addition, the SPEs 120-134 are coupled to MIC 198 and BIC 197 via the EIB 196. The MIC 198 provides a communication interface to shared memory 199. The BIC 197 provides a communication interface between the CBE 100 and other external buses and devices.

The PPE 110 may be a dual-threaded processor. The combination of this dual threaded PPE 110 and the eight SPEs 120-134 makes the CBE 100 capable of handling 10 simultaneous threads and over 128 outstanding memory requests. The PPE 110 acts as a controller for the other eight SPEs 120-134 which handle most of the computational workload. The PPE 110 may be used to run conventional operating systems while the SPEs 120-134 perform vectorized floating point code execution, for example.

The SPEs 120-134 comprise a synergistic processing unit (SPU) 140-154, memory flow control units 155-162, local memory or store 163-170, and an interface unit 180-194. The local memory or store 163-170, in one exemplary embodiment, comprises a 256 KB instruction and data memory which is visible to the PPE 110 and can be addressed directly by software.

The PPE 110 may load the SPEs 120-134 with small programs or threads, chaining the SPEs together to handle each step in a complex operation. For example, a set-top box incorporating the CBE 100 may load programs for reading a DVD, video and audio decoding, and display, and the data would be passed off from SPE to SPE until it finally ended up on the output display. At 4 GHz, each SPE 120-134 gives a theoretical 32 GFLOPS of performance with the PPE 110 having a similar level of performance.

The memory flow control units (MFCs) 155-162 serve as an interface for an SPU to the rest of the system and other elements. The MFCs 155-162 provide the primary mechanism for data transfer, protection, and synchronization between main storage and the local storages 163-170. There is logically an MFC for each SPU in a processor. Some implementations can share resources of a single MFC between multiple SPEs. In such a case, all the facilities and commands defined for the MFC must appear independent to software for each SPU. The effects of sharing an MFC are limited to implementation-dependent facilities and commands.

Various bus units may execute commands on EIB 196. In the example depicted in FIG. 1, these bus units may include PPE 110, SPEs 120, 122, 124, 126, 128, 130, 132, 134, MIC 198, and BIC 197. PPE 110 is a primary processing element, and SPEs 120-234 are support processing elements. Even with the best intentions to design CBE 100 to avoid livelock conditions, two or more of these bus units may enter into a livelock condition. In accordance with an illustrative embodiment, livelock resolution unit 102, connected to EIB 196, and control processor 104 attempt to resolve livelock conditions. The bus units include watchdog timers (not shown) that track how long commands have stayed pending without completing. When a bus unit detects a timeout condition, or potential timeout condition, the bus unit sets a recoverable error status bit that indicates, through EIB 196 to a central fault isolation unit (not shown) in FIG. 1, the timeout condition. The bus unit also activates a livelock resolution request (LRR) signal to notify control processor 104 via a path through 102.

Control processor 104 may be, for example, an off-chip service processor that is used to service the system. For instance, control processor 104 may perform other system tasks, such as determining how fast a cooling fan runs and the like. One particular task that control processor 104 may perform is to monitor a temperature of the system and thermal throttle CBE 100, or more specifically PPE 110, to control power consumption and, thus, heat generation. Control processor 104 may manage particular status information in control register 106. For example, control processor 104 may set bits in control register 106 to indicate a thermal throttle mode, a bus mode, and so forth. In an alternative embodiment, control processor 104 may be on-chip within CBE 100.

In the illustrative embodiment, livelock resolution unit 102 monitors the livelock request signals from bus units. Responsive to one or more livelock request signals being activated, control processor 104 performs actions to attempt to resolve the livelock condition. For example, control controller 104 may thermal throttle PPE 110, quiesce SPEs 120-134, or signal EIB 196 to serialize bus commands.

Livelock resolution unit 102 calls attention to control processor 104 responsive to a livelock resolution request and communicates the actions of control processor 104 to EIB 196 and the bus units. Livelock resolution unit 102 may exist within pervasive logic in CBE 100.

Throttling is the ability of a processing element to change between stop (idle), and full speed modes, at very high frequency (hundreds of kilohertz). This switching looks to the system as a decrease in the working frequency of processing element, and leads to lower power consumption. In the depicted example, control processor 104 may thermal throttle PPE 110, the primary processing element.

To "quiesce" generally means to become temporarily inactive or disabled. In the context of this disclosure, to quiesce means to quiet the system by stopping the issuing of new commands. This prevents new commands from being sent to the bus and allows current commands to complete, if possible. In the depicted example, control processor 104 may quiesce SPEs 120-134, the support processing elements.

When the bus is in a serialized mode, or single-instruction mode, each bus command must complete its process from issue to snoop responses through combined snoop responses returned back to the initiating bus unit before a next bus command is allowed to proceed. Alternatively, a serialized bus mode may prevent subsequent bus commands from starting until any data transfers resulting from a current command have completed. In the depicted example, control processor 104 may set EIB 196 to operate in serialized mode.

Once a bus unit that issued a livelock resolution request has managed to successfully issue its command, it deactivates its livelock resolution request. If all livelock resolution request signals are deactivated, then control processor 104 instructs EIB 196 and all bus units to resume normal activity. On the other hand, if control processor 104 determines that a predetermined amount of time passes without any progress being made, it determines that a hang condition has occurred.

Figure 2A:
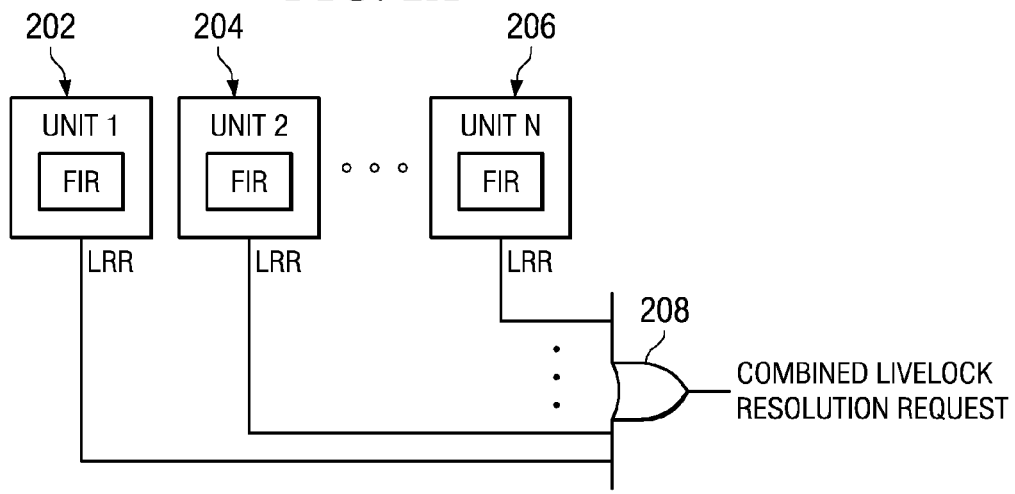
FIGS. 2A and 2B are diagrams that illustrate a livelock resolution unit in accordance with an exemplary embodiment.
Figure 2B:
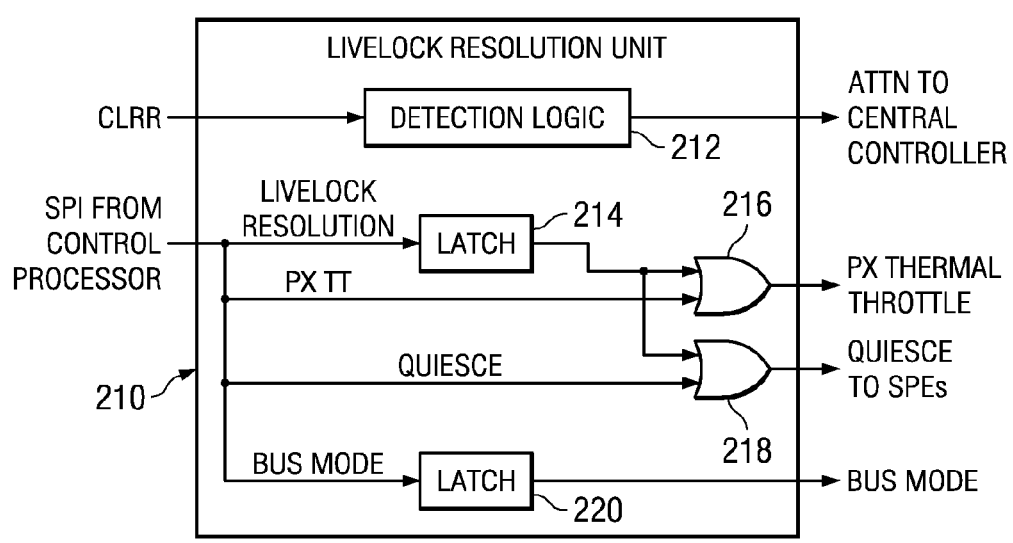

FIGS. 2A and 2B are diagrams that illustrate a livelock resolution unit in accordance with an exemplary embodiment. With reference to FIG. 2A, bus units 1-N 202, 204, 206 detect whether a watchdog timer has expired, or is about to expire. In one exemplary embodiment, bus units 202, 204, 206 may determine whether their EIB operation is some predetermined percentage, such as 50%, away from expiring. Thus, a "timeout condition," as used herein, may exist when the watchdog timer completely expires or is a predetermined percentage away from expiring.

As described above, bus units 1-N 202-206 may include PPE 110, SPEs 120, 122, 124, 126, 128, 130, 132, 134, MIC 198, and BIC 197 in FIG. 1. However, bus units 1-N 202-206 may be any combination of processors, memory control units, and peripheral control units (e.g., hard disk drive controllers, network interface cards, and the like).

When a given bus unit detects a timeout condition, it sets a bit in its fault isolation register (FIR) to indicate a recoverable error and then activates a livelock resolution request (LRR) signal. The LRR signal may be a separate signal carried through the bus or may be encoded within a snoop response signal or other existing signal. OR gate 208 combines the LRR signals from bus units 1-N 202-206 to form a combined livelock resolution request (CLRR) signal.

Turning to FIG. 2B, livelock resolution unit 210 receives the combined livelock resolution request signal at detection logic 212. In one exemplary embodiment, detection logic 212 may be a simple latch. However, in alternative embodiments, detection logic 212 may perform more advanced detection, such as determining whether the CLRR signal remains activated for a predetermined number of clock cycles. If detection logic 212 detects a livelock condition, an attention (ATTN) signal is sent to the control processor.

The control processor responds to the ATTN signal by setting status information to perform actions to attempt to correct the livelock condition. This status information is communicated back to livelock resolution unit 210 through service peripheral interface (SPI), which is a protocol used to communicate with the Cell Broadband Engine. A person of ordinary skill in the art will recognize that the aspects of the illustrative embodiments are not limited to the Cell Broadband Engine architecture or the service peripheral interface. The control processor may communicate with livelock resolution unit 210 using any protocol capable of communicating the actions necessary to attempt livelock resolution.

In the depicted example, the SPI information includes a livelock resolution signal, a processor element thermal throttle (PX TT) signal, a quiesce signal, and a bus mode signal. Latch 214 receives and stores the livelock resolution signal. OR gate 216 combines the output of latch 214 with the thermal throttle signal to generate a PX thermal throttle signal that is sent to the PPE. Therefore, livelock resolution unit 210 sends a PX thermal throttle signal to the PPE if the control processor engages PX thermal throttle or if the control processor engages livelock resolution.

OR gate 218 combines the output of latch 214 with the quiesce signal to generate a quiesce signal that is sent to the SPEs. Therefore, livelock resolution unit 210 sends a quiesce signal to the SPEs if the control processor engages quiesce to the SPEs explicitly or if the control processor engages livelock resolution.

Latch 220 receives and stores a bus mode signal from the control processor. The control processor may set the bus signal to a serialized or single-instruction mode during livelock resolution or may reset the bus mode to normal activity if no livelock resolution request signal is activated. This bus mode signal is sent through livelock resolution unit 210 and stored in latch 220 for communication to the bus.

FIG. 3 is a flowchart illustrating operation of a command monitoring component within a bus unit within a multiple processor data processing system with livelock resolution in accordance with an illustrative embodiment. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

With particular reference to FIG. 3, operation begins and the bus unit begins command monitoring (block 302). The bus unit then determines whether a timeout condition occurs (block 304). As mentioned above, a timeout condition may exist, for example, if a watchdog timer completely expires or if the watchdog timer is a predetermined percentage of the way from expiring. If a timeout condition does not exist in block 304, the bus unit determines whether the command has completed (block 306). If the command has not completed, operation returns to block 304 to determine whether a timeout condition exists. If the command has completed in block 306, monitoring ends.

Returning to block 304, if a timeout condition exists, the bus unit sets a recoverable error status bit to indicate the timeout condition (block 308) and activates a livelock resolution request signal (block 310).

Thereafter, the bus unit determines whether the command has completed (block 312). If the command has not completed, operation returns and block 312 repeats until the command completes. If the command has completed in block 312, then the bus unit deactivates the livelock resolution request (block 314), and monitoring ends.

At any point during the operation of the flowchart illustrated in FIG. 3, the control processor may detect a livelock request from any of the bus units. Thus, in this instance if the bus unit is a SPE, the bus unit will not attempt to initiate another command, because the control processor will have activated a quiesce signal in response to the livelock resolution request signal. If the bus unit is a PPE, then the bus unit may be thermal throttled during operation of the flowchart.

At any point during the operation of the flowchart illustrated in FIG. 3, the control processor may determine that a hang condition exists as a result of a livelock request from any of the bus units. In this instance, the control processor may assert a checkstop. A checkstop causes all clocks to stop. The processing elements are then immobilized, which allows for a status dump and/or debug.

Figure 4:
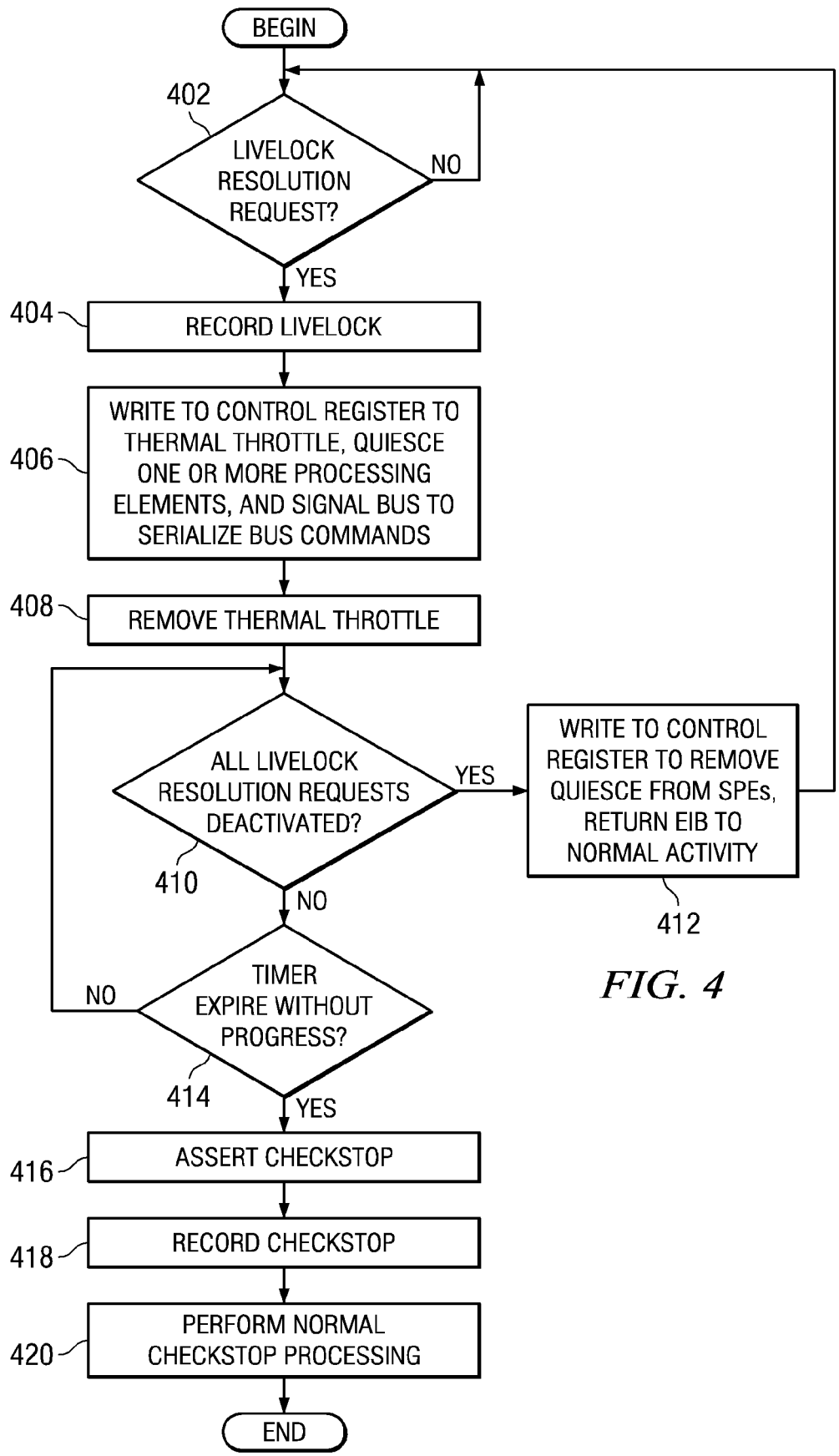
FIG. 4 is a flowchart illustrating operation of a control processor for livelock resolution in accordance with an illustrative embodiment.

FIG. 4 is a flowchart illustrating operation of a control processor for livelock resolution in accordance with an illustrative embodiment. Operation begins and the control processor determines whether a livelock resolution request signal is activated by one of the bus units (block 402). If a livelock resolution request signal is not activated, then block 402 repeats until a livelock resolution request signal is activated.

If a livelock resolution request signal is activated in block 402, the control processor records the livelock (block 404). Software may cause a significant number of livelocks, which may decrease the efficiency of the software. However, because livelocks do not cause the software to hang, the software developer may not be aware that livelocks are occurring. The control processor may record the livelock event in a persistent memory, such as a non-volatile random access memory (NVRAM) or the like, to allow for better debugging.

Next, the control processor writes to a control register to thermal throttle one or more processing elements, quiesce one or more processing elements, and signal the bus to serialize bus commands (block 406). Then, after a predetermined period of time, the control processor then removes the thermal throttle (block 408). Removing the thermal throttle prevents the multiple processor data processing system from staying in a livelock resolution mode, because thermal throttle prevents instructions from being dispatched, which artificially creates livelock detection.

Thereafter, the control processor determines whether all livelock resolution requests signals have been deactivated (block 410). If all livelock resolution request signals have been deactivated, the control processor writes to the control register to remove quiesce and returns the EIB to normal activity (block 412). Thereafter, operation returns to block 402 to determine whether a livelock resolution request subsequently becomes activated.

If all livelock resolution request signals have not been deactivated in block 410, the control processor determines whether a predetermined amount of time has expired without any progress being made on the outstanding commands (block 414). If the predetermined amount of time has not expired without progress being made, operation returns to block 410 to determine whether all livelock resolution request signals have been deactivated.

If the predetermined amount of time has expired without progress being made on the outstanding commands in block 414, the control processor asserts a checkstop to stop all clocks (block 416). The control processor then records the checkstop (block 418) to allow for better debugging. Then, the control processor performs normal checkstop processing (block 420), as known in the art, and operation ends.

Thus, the aspects of the illustrative embodiments solve the disadvantages of the prior art by providing a mechanism for resolving livelock conditions in a multiple processor data processing system. When a bus unit detects a timeout condition, or potential timeout condition, the bus unit activates a livelock resolution request signal. A livelock resolution unit receives livelock resolution requests from the bus units and signals an attention to a control processor. The control processor performs actions to attempt to resolve the livelock condition. For example, the control controller may thermal throttle one or more processing elements, quiesce one or more processing elements, or signal the bus to serialize bus commands.

Once a bus unit that issued a livelock resolution request has managed to successfully issue its command, it deactivates its livelock resolution request. If all livelock resolution request signals are deactivated, then the control processor instructs the bus and all bus units to resume normal activity. On the other hand, if the control processor determines that a predetermined amount of time passes without any progress being made, it determines that a hang condition has occurred.

It should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software, which includes but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for livelock resolution in a data processing system, wherein the processing system comprises a bus, at least one primary processing element, and a plurality of support processing elements, the method comprising:
    responsive to a timeout condition in at least one of a plurality of bus units, generating a livelock resolution request signal;
    responsive to the livelock resolution request signal, signaling an attention to a control processor, wherein responsive to the attention, the control processor sets status information to perform one or more actions to attempt to correct a potential livelock condition, and wherein the status information comprises a livelock resolution signal; and
    responsive to the control processor setting the livelock resolution signal, quiescing at least a subset of the primary processing element and the plurality of support processing elements.

2. The method of claim 1, wherein the status information comprises a bus mode signal, the method further comprising:
    responsive to the control processor setting the bus mode signal to a serialized mode, entering the bus into a serialized mode.

3. The method of claim 1, wherein quiescing at least a subset of the primary processing element and the plurality of support processing elements comprises throttling the at least one primary processing element.

4. The method of claim 1, wherein the plurality of bus units comprise the at least one primary processing element, the plurality of support processing elements, and the bus, wherein generating a livelock resolution request signal comprises:
    generating, by at least one of the at least one primary processing element or the plurality of supporting processing elements, a livelock resolution request signal.

5. The method of claim 1, wherein the plurality of bus units comprise a memory control unit or a peripheral control unit, wherein generating a livelock resolution request signal comprises:
    generating, by a given one of the memory control unit or the peripheral control unit, a livelock resolution request signal.

6. The method of claim 1, wherein each bus unit within the plurality of bus units has a watchdog timer, wherein the timeout condition exists when the watchdog timer expires, wherein generating a livelock resolution request signal comprises:
    generating, by a given bus unit within the plurality of bus units, a livelock resolution request signal responsive to expiration of its watchdog timer.

7. The method of claim 1, wherein each bus unit within the plurality of bus units has a watchdog timer and wherein the timeout condition exists when the watchdog timer is a percentage away from expiring, wherein generating a livelock resolution request signal comprises:

generating, by a given bus unit within the plurality of bus units, a livelock resolution request signal responsive to its watchdog timer being a percentage away from expiring.

8. The method of claim 1, wherein generating a livelock resolution request signal comprises:

receiving livelock resolution request signals from the plurality of bus units;

combining the livelock resolution request signals from the plurality of bus units to form a combined livelock resolution request signal.

9. The method of claim 8, wherein generating a livelock resolution request signal further comprises:

determining whether the combined livelock resolution request signal is activated for an amount of time.

10. The method of claim 1, further comprising:

determining whether all livelock resolution request signals are deactivated; and responsive to all livelock resolution request signals being deactivated, deasserting the quiesce signal to the subset of the plurality of processing elements and returning the bus to a normal mode.

11. The method of claim 1, further comprising:

responsive to a period of time expiring without progress being made on outstanding commands, asserting, by the control processor, a checkstop to stop all clocks; and performing, by the control processor, checkstop processing.

12. A method for livelock resolution in a data processing, wherein the data processing system comprises a bus, at least one primary processing element, and a plurality of support processing elements, the method comprising:

responsive to a timeout condition in at least one of the at least one primary processing element or the plurality of support processing elements, generating a livelock resolution request signal;

receiving one or more livelock resolution request signals from the at least one primary processing element or the plurality of support processing elements;

combining the one or more livelock resolution request signals from the at least one primary processing element or the plurality of support processing elements to form a combined livelock resolution request signal;

responsive to the combined livelock resolution request signal, signaling an attention to a control processor, wherein responsive to the attention, the control processor sets status information through a service peripheral interface to perform one or more actions to attempt to correct a potential livelock condition, and wherein the status information comprises a livelock resolution signal, a processor element thermal throttle signal, a quiesce signal, and a bus mode signal; and responsive to the control processor setting the livelock resolution signal, quiescing at least a subset of the primary processing element and the plurality of support processing elements and throttling the at least one primary processing element.

13. The method of claim 12, further comprising:

responsive to the control processor setting the bus mode signal to a serialized mode, entering the bus into a serialized mode.

14. The method of claim 12, wherein each bus unit within the plurality of bus units has a watchdog timer, wherein the timeout condition exists when the watchdog timer expires, wherein generating a livelock resolution request signal comprises:

generating, by a given bus unit within the plurality of bus units, a livelock resolution request signal responsive to expiration of its watchdog timer.

15. The method of claim 12, wherein each bus unit within the plurality of bus units has a watchdog timer and wherein the timeout condition exists when the watchdog timer is a percentage away from expiring, wherein generating a livelock resolution request signal comprises:

generating, by a given bus unit within the plurality of bus units, a livelock resolution request signal responsive to its watchdog timer being a percentage away from expiring.

16. The method of claim 12, wherein generating a livelock resolution request signal further comprises:

determining whether the combined livelock resolution request signal is activated for an amount of time.

17. The method of claim 12, further comprising:

determining whether all livelock resolution request signals are deactivated; and responsive to all livelock resolution request signals being deactivated, deasserting the quiesce signal to the subset of the plurality of processing elements and returning the bus to a normal mode.

18. The method of claim 12, further comprising:

responsive to a period of time expiring without progress being made on outstanding commands, asserting, by the control processor, a checkstop to stop all clocks; and performing, by the control processor, checkstop processing.

19. A method for livelock resolution in a data processing, wherein the data processing system comprises a bus and a plurality of processing elements comprising at least one primary processing element and a plurality of support processing elements, the method comprising:

responsive to a watchdog timer in at least one of the plurality of processing elements being a percentage away from expiring, generating a livelock resolution request signal;

receiving one or more livelock resolution request signals from the plurality of processing elements;

combining the one or more livelock resolution request signals from the plurality of processing elements to form a combined livelock resolution request signal;

determining whether the combined livelock resolution request signal is activated for an amount of time;

responsive to the combined livelock resolution request signal, signaling an attention to a control processor, wherein responsive to the attention, the control processor sets status information through a service peripheral interface to perform one or more actions to attempt to correct a potential livelock condition, and wherein the status information comprises a livelock resolution signal, a processor element thermal throttle signal, a quiesce signal, and a bus mode signal;

responsive to the control processor asserting the livelock resolution signal, sending a quiesce signal to at least a subset of the plurality of support processing elements and temporarily asserting the processor element thermal throttle signal to the primary processing element;

responsive to the control processor setting the bus mode signal to a serialized mode, entering the bus into a serialized mode;

determining whether all livelock resolution request signals are deactivated; and responsive to all livelock resolution request signals being deactivated, deasserting the quiesce signal to the subset of the plurality of processing elements and returning the bus to a normal mode.

20. The method of claim 19, further comprising:

responsive to a period of time expiring without progress being made on outstanding commands, asserting, by the control processor, a checkstop to stop all clocks; and performing, by the control processor, checkstop processing.

* * * * *